United States Patent
Baker (12)

(10) Patent No.: US 6,453,644 B1
(45) Date of Patent: Sep. 24, 2002

(54) METHOD AND MEANS FOR PRODUCING, CONVEYING, STORING AND UTILIZING AIR PILLOWS

(75) Inventor: Bruce A. Baker, Cincinnati, OH (US)

(73) Assignee: Storopack, Inc., Cincinnati, OH (US)

( * ) Notice: Subject to any disclaimer, the term of this patent is extended or adjusted under 35 U.S.C. 154(b) by 0 days.

(21) Appl. No.: 09/332,700

(22) Filed: Jun. 14, 1999

(51) Int. Cl.$^7$ .......................... B65B 31/00; B65B 23/00
(52) U.S. Cl. ............................ 53/403; 53/472; 53/493; 53/79; 53/139.5; 226/97.1; 406/88
(58) Field of Search .................... 53/472, 403, 139.5, 53/79, 155, 474, 493; 156/147, 145, 156; 406/88; 226/97.1–97.3

(56) References Cited

U.S. PATENT DOCUMENTS

| | | | | |
|---|---|---|---|---|
| 3,667,593 A | * | 6/1972 | Pendleton | 53/474 |
| 3,708,208 A | | 1/1973 | Fuss | |
| 4,167,235 A | * | 9/1979 | Green | 406/135 |
| 4,284,372 A | | 8/1981 | Smith | |
| 4,744,702 A | * | 5/1988 | Wiseman et al. | 406/88 |
| 4,799,830 A | | 1/1989 | Fuss | |
| 4,822,214 A | * | 4/1989 | Aidlin et al. | 406/88 |
| 5,108,673 A | | 4/1992 | Wegmann | |
| 5,209,387 A | * | 5/1993 | Long et al. | 406/88 |
| 5,323,819 A | | 6/1994 | Shade | |
| 5,413,855 A | | 5/1995 | Kolaska et al. | |
| 5,484,237 A | * | 1/1996 | Langenbeck | 406/88 |
| 5,503,505 A | * | 4/1996 | Vejchoda | 406/88 |
| 5,623,815 A | | 4/1997 | Hornstein et al. | |
| 5,873,215 A | * | 2/1999 | Aquarius et al. | 53/403 |

* cited by examiner

*Primary Examiner*—Stephen F. Gerrity
(74) *Attorney, Agent, or Firm*—Wood, Herron & Evans, L.L.P.

(57) ABSTRACT

Apparatus for producing and conveying air pillows comprises an air pillow production machine which produces a continuous web of air filled pillows, ductwork extending away from the air pillow production machine and through which the web of air pillows is conveyed, and a blower which conveys the web of air pillows from the air pillow production machine and through the ductwork. The web of air pillows are conveyed into a hopper for storage. A sensor senses a condition of at least one of the air pillows in the web of air pillows being deflated or a stall condition of the web of air pillows in the event the web of air pillows stops moving through the ductwork. A controller controls the air pillow production machine in response to signals from the sensor. The sensor and controller are a whisker trigger connected to a micro switch. The hopper has an open top through which the web of air pillows are conveyed, and an opening near a bottom thereof through which air pillows may be pulled by an operator for insertion into a box.

20 Claims, 3 Drawing Sheets

METHOD AND MEANS FOR PRODUCING, CONVEYING, STORING AND UTILIZING AIR PILLOWS

FIELD OF THE INVENTION

This invention relates generally to air filled pillows for insertion into, and protecting during shipping an article packaged in, a box, and more particularly to an efficient method and means for producing, conveying, storing and utilizing those air pillows.

BACKGROUND OF THE INVENTION

In the process of shipping an item from one location to another, a protective packaging material is typically placed in the shipping carton or box, to fill any voids and/or to cushion the item during the shipping process. Some conventional protective packaging materials are plastic, for example expanded polystyrene, foam peanuts and starch peanuts. Another protective packaging material is air filled pillows. Such air filled pillows may be produced by a variety of commercially available air pillow production machines. Such machines may form air pillows from flat plastic film, folded plastic film, tubular plastic film or interconnected preformed open topped plastic bags.

The current practice of handling, i.e. conveying, and storing air pillows for their use after their production is to utilize a mechanical conveyor which mechanically conveys the air pillows from the air pillow production machine to a storage hopper. Typically such mechanical conveyors are relatively expensive and complicated, and are subject to malfunction which results in down time of the conveyor and intensive maintenance, etc. All of these factors limit the practical length that the storage hopper can be from the air pillow production machine. That is, beyond some distance it simply becomes cost prohibitive to utilize such a mechanical conveyor to mechanically convey the air pillows from the air pillow production machine to the storage hopper.

It would be desirable to devise some method or system of handling, conveying, storing and the like, the air pillows which overcomes the drawbacks associated with the current techniques.

SUMMARY OF THE INVENTION

Accordingly, the present invention addresses the production, conveyance, storage and utilization of such air filled pillows. Rather than convey the air pillows by a mechanical means, the present invention provides a means and method for pneumatically conveying the air pillows. In one aspect, apparatus for producing and conveying air pillows comprises an air pillow production machine which produces a continuous web of air filled pillows, ductwork extending away from the air pillow production machine and through which the web of air pillows is conveyed, and a blower which conveys the web of air pillows from the air pillow production machine and through the ductwork.

In another aspect, apparatus for producing, conveying and storing air pillows comprises an air pillow production machine which produces a continuous web of air filled pillows, ductwork extending away from the air pillow production machine and through which the web of air pillows is conveyed, a blower which conveys the web of air pillows from the air pillow production machine and through the ductwork, and a hopper into which the web of air pillows is conveyed for storage.

In yet another aspect, apparatus for producing and conveying air pillows comprises an air pillow production machine which produces a continuous web of air filled pillows, ductwork extending away from the air pillow production machine and through which the web of air pillows is conveyed, a blower which conveys the web of air pillows from the air pillow production machine and through the ductwork, a sensor which senses a condition of at least one of the air pillows in the web of air pillows being deflated, and a controller which controls the air pillow production machine in response to signals from the sensor.

In still another aspect, apparatus for producing and conveying air pillows comprises an air pillow production machine which produces a continuous web of air filled pillows, ductwork extending away from the air pillow production machine and through which the web of air pillows is conveyed, a blower which conveys the web of air pillows from the air pillow production machine and through the ductwork, a sensor which senses a stall condition of the web of air pillows in the event the web of air pillows stops moving through the ductwork, and a controller which controls the air pillow production machine in response to signals from the sensor.

In a preferred embodiment, the sensor is a mechanical probe which extends into a path of conveyance of the web of air pillows and which is movable to and between and engaged position and a disengaged position. The probe is moved into the engage position by the air pillows during conveyance of the web of air pillows, and moves to the disengaged position when either the probe encounters a deflated air pillow in the web of air pillows or when the web of air pillows stops moving through the ductwork.

In another preferred embodiment, the probe is a whisker trigger and the controller is a micro switch to which the whisker trigger is connected. The micro switch interrupts power to the air pillow production machine when the trigger moves to the disengaged position.

In yet another preferred embodiment, the web of air pillows feeds downwardly from the air pillow production machine, around a guide member, and into a horizontal portion of the ductwork. The micro switch is mounted to the guide member and extends downwardly below the guide member such that the web of air pillows engages the whisker trigger as the web passes around the guide member and transitions from a vertical orientation to a horizontal orientation. The guide member is circular in cross-section and is about 3 inches in diameter. The circular guide member has a downwardly directed slot therein and the whisker trigger passes through the slot. The slot defines a sector having an included angle of about 90 degrees. A blower box is disposed between the blower and the ductwork, and the guide member is mounted to the blower box.

In still another aspect, apparatus for producing, conveying and storing air pillows comprises an air pillow production machine which produces a continuous web of air filled pillows, ductwork extending away from the air pillow production machine and through which the web of air pillows is conveyed, a blower which conveys the web of air pillows from the air pillow production machine and through the ductwork, a sensor which senses a condition of at least one of the air pillows in the web of air pillows being deflated, a controller which controls the air pillow production machine in response to signals from the sensor, and a hopper into which the web of air pillows is conveyed for storage.

In still another aspect, apparatus for producing, conveying and storing air pillows comprises an air pillow production machine which produces a continuous web of air filled pillows, ductwork extending away from the air pillow production machine and through which the web of air pillows is conveyed, a blower which conveys the web of air pillows from the air pillow production machine and through the ductwork, a sensor which senses a condition of at least one of the air pillows in the web of air pillows being deflated, a controller which controls the air pillow production machine in response to signals from the sensor, and a hopper into which the web of air pillows is conveyed for storage.

In a preferred embodiment, the hopper has an open top and the web of air pillows is conveyed into the hopper through the open top. The hopper includes an opening near a bottom thereof through which air pillows may be pulled by an operator for insertion into a box.

The invention also provides a number of methods relating to the production, conveyance, storage and utilization of such air filled pillows. One method, for producing and conveying air pillows, comprises producing, with an air pillow production machine, a continuous web of air filled pillows, and conveying the web of air pillows with an air current from the air pillow production machine to a desired location.

Another method, for producing, conveying and storing air pillows, comprises producing, with an air pillow production machine, a continuous web of air filled pillows, conveying the web of air pillows with an air current from the air pillow production machine to a storage hopper, and conveying the web of air pillows into the storage hopper.

Yet another method, for producing, conveying, storing and utilizing air pillows, comprises producing, with an air pillow production machine, a continuous web of air filled pillows, conveying the web of air pillows with an air current from the air pillow production machine to a storage hopper, conveying the web of air pillows into the storage hopper, and removing air pillows from the storage hopper and placing them in a box in which an article is to be shipped.

The present invention therefore completely eliminates the mechanical conveyor as the means of conveyance of the air pillows from the air pillow production machine to the storage hopper. Rather, the air pillows are pneumatically conveyed. The apparatus and method of the present invention for pneumatically conveying the air pillows from the air pillow production machine to the storage hopper is much simpler in that, except for the blower, there are no mechanical moving parts in the system. The system of the invention is thus much simpler, much less expensive and requires much less maintenance than mechanical-type conveyors. Due to the simple and inexpensive nature of the pneumatic air pillow conveyance system of the present invention, the only limit on the distance between the air pillow production machine and the storage hopper is the pressure head of the blower. Thus, by appropriately selecting the output of the blower, the storage hoppers can be as far away from the air pillow production machine as is desired or required, both in horizontal distance and in vertical distance.

These and other advantages of the present invention will become more readily apparent during the following detailed description taken in conjunction with the drawings herein, in which:

DETAILED DESCRIPTION OF THE INVENTION

Figure 1:
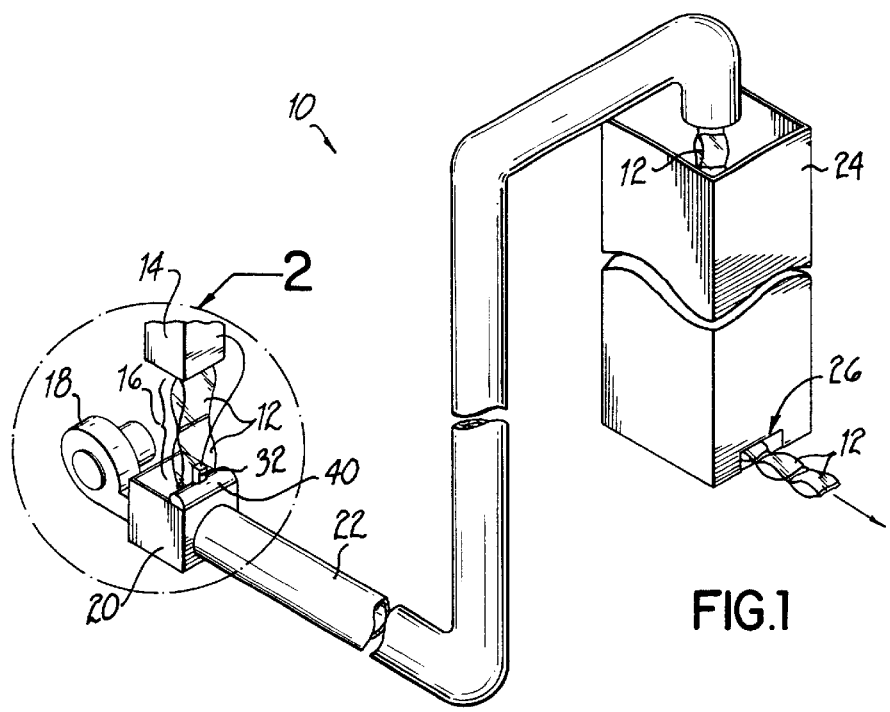
FIG. 1 is a perspective view of the apparatus for producing, conveying and storing air pillows according to the present invention.
Figure 2:
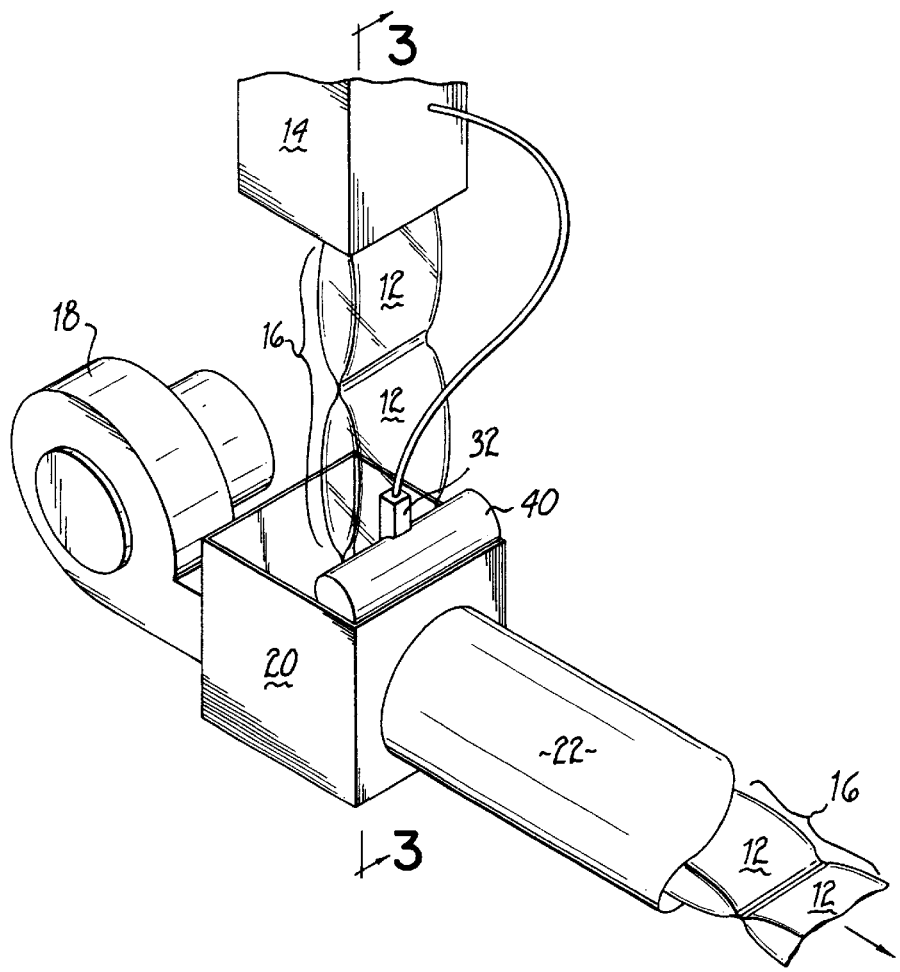
FIG. 2 is an enlarged perspective view of the encircled portion 2 of FIG. 1.

Referring first to FIG. 1, there is illustrated apparatus 10 for producing, conveying and storing air pillows 12. The air pillows 12 are produced by an air pillow production machine 14, which produces a continuous web 16 of air filled pillows 12. The machine 14 may be most any commercially available air pillow production machine which produces air pillows from for example flat plastic film, folded plastic film, tubular plastic film or interconnected preformed open topped plastic bags. The air pillow production machine 14 may for example be of the type manufactured by Amasec Services of Coventry, England and marketed as the Airfil™ 1200, or of the type distributed by STOROpack in the U.S. as its AIRplus™ machine. A blower 18 is fitted to an open topped blower box 20 which in turn has ductwork 22 extending therefrom which empties air filled pillows 12 into a storage hopper 24. The hopper 24 may be spaced a horizontal distance, as well as a vertical distance, from the air pillow production machine 14. For example, with a 1 hp blower 18, the web 16 of air pillows 12 can easily be conveyed 75 feet horizontally and 25 feet vertically from the air pillow production machine 14. The hopper 24 includes an opening 26 at its lower end whereby an operator can remove air pillows 12 as needed. The blower 18 may preferably be of the type manufactured by Dayton of Chicago, Ill. as Part No. 7C447, rated at 1 hp. The blower box 20 may preferably be of the type manufactured by STOROpack of Downey, Calif. as Part No. VENTURI. The ductwork 22 may preferably be of the type manufactured by Norfab as Part No. 10" Seamless.

Figure 3:
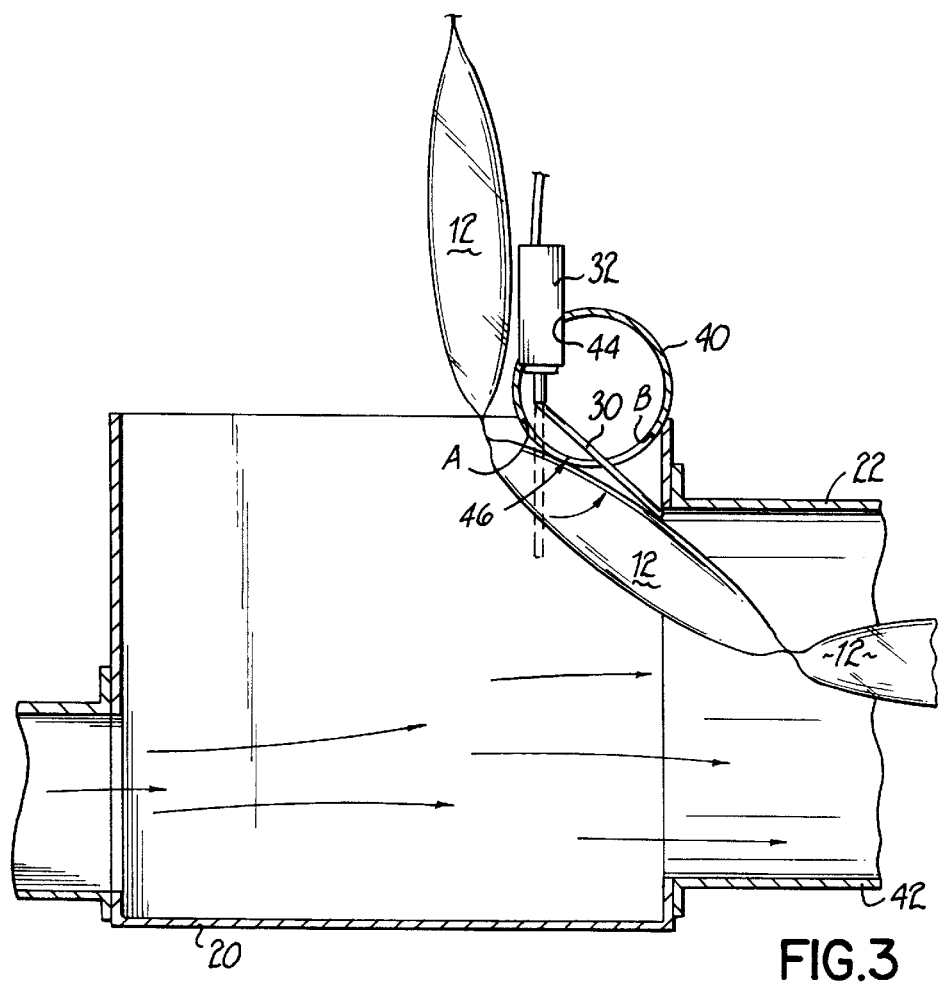
FIG. 3 is a view along line 3—3 of FIG. 2 illustrating the sensor of the apparatus sensing the presence of an inflated air pillow in a taught web of air pillows.
Figure 4:
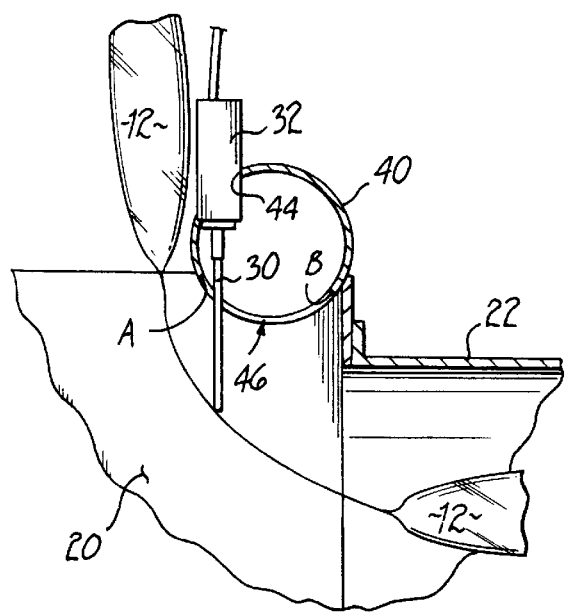
FIG. 4 is a view similar to FIG. 3 but illustrating the sensor of the apparatus sensing a condition of a deflated air pillow.
Figure 5:
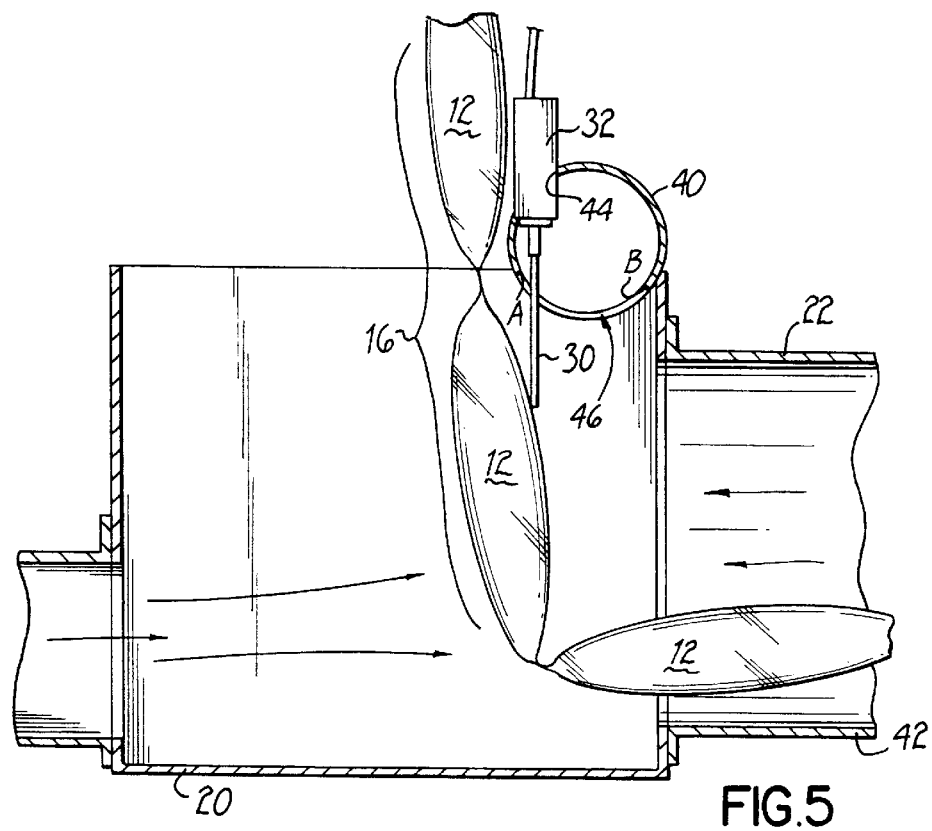
FIG. 5 is a view similar to FIG. 3 but illustrating the apparatus sensor sensing a stall condition of the web of air pillows.

Referring now to FIGS. 2 through 5, the apparatus 10 of the present invention includes a sensor which senses a condition of one of the air pillows 12 in the web 16 of air pillows 12 being deflated (see FIG. 4), and senses a stalled condition of the web 16 of air pillows 12 in the event that the web 16 of air pillows 12 stops moving through the ductwork 22 as would happen when the hopper 24 becomes full of air pillows 12 (see FIG. 5). A controller controls the air pillow production machine 14 in response to the signals generated by the sensor.

More particularly, the sensor is a mechanical probe, preferably a whisker trigger 30, which is connected to the controller, preferably a microswitch 32. As is seen in FIG. 3, the whisker trigger 30 extends into the path of conveyance of the web 16 of air pillows 12, and is movable to and between an engaged position (FIG. 3) and a disengaged position (FIGS. 4 and 5).

The web 16 of air pillows 12 feeds downwardly from the air pillow production machine 14 and around a guide member 40 and into a horizontal portion 42 of the ductwork 22. Guide member 40 is preferably a 10-inch length of 3-inch diameter PVC pipe. An opening 44 is cut into the PVC pipe 40 for mounting the microswitch 32 therein. A ⅛" wide slot 46 is cut into the lower side of the PVC pipe and extends from point A to point B, an angle of approximately 90°. As is seen in FIG. 3, the whisker trigger 30 extends downwardly below the guide member 40 such that the web 16 of air pillows 12 engages the whisker trigger 30 as the web 16 passes around the guide member 40 and transitions from a vertical orientation to a horizontal orientation. The whisker trigger 30 is preferably of the type manufactured by Square D as Part No. XCKP106, whereas the microswitch 32 is preferably of the type distributed by Grainger of Chicago, Ill. as Part No. 4B799.

Figure 6:
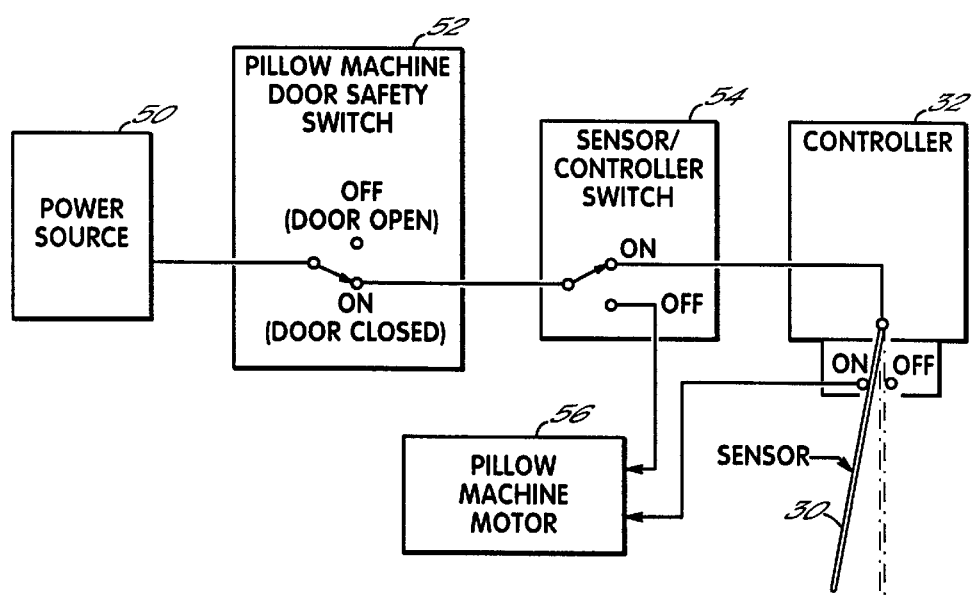
FIG. 6 is an electrical schematic diagram of the sensor of the apparatus.

Referring now to FIG. 6, there is illustrated an electrical circuit diagram for the present invention. More particularly, the power source for the machine 10 is denoted 50. The machine 10 typically includes a door safety switch 52 which, when the door is open, is in the off position preventing power from reaching the pillow machine motor 56. When the door is closed, the switch 52 is in the on position which permits power from the power source 50 to reach the pillow machine motor 56. A sensor/controller switch 54, for example a toggle switch of the type manufactured by Carting Switch as Part No. 2FA53-73 and distributed by Grainger as Stock No. 4X840, is interposed in the electrical circuit between the pillow machine door safety switch 52 and the pillow machine motor 56. Placing the sensor/controller switch 54 in the on position inserts the controller 32 and sensor 30 into the electrical circuit between the power source 50 and the pillow machine motor 56. Since, however, at the initial start up of the machine 10, there will be no web of air pillows engaging the sensor 30, the sensor/controller switch 54 must be switched to the off position to bypass the controller 32 and sensor 30 to permit power to reach the pillow machine motor 56 from the power source 50. After initial startup of the machine 10, and the web 16 of air pillows 12 begins feeding around the guide member 40 so as to deflect the sensor 30 to the on position, the sensor/controller switch 54 can be switched to the on position to then place the controller 32 and sensor 30 in the electrical circuit between the power source 50 and the pillow machine motor 56. Thus, in the event that the sensor 30 senses either the condition of FIG. 4, i.e. a deflated bag 12, or the condition of FIG. 5, i.e. slack in the web 16 of bags 12, the sensor 30 moves to the off or inoperable position and the controller 32 interrupts power to the pillow machine motor 56 from the power source 50 stopping the machine 10. An operator may then examine the machine and hopper to determine the source of stoppage; i.e. either full hopper or defective pillows.

The sensor/controller circuit comprising sensor/controller switch 54, sensor 30, controller 32 and associated wiring harness is preferably "modular." That is, this circuit is preferably designed as a plug-in module. Thus, in the event that a defective pillow production machine is encountered, the sensor circuit is simply unplugged from the defective machine, the defective machine is replaced with another machine, and the circuit is plugged into the replacement machine.

Those skilled in the art will readily recognize numerous adaptations and modifications which can be made to the present invention which will result in an improved method and means for producing, conveying and storing air pillows, yet all of which will fall within the spirit and scope of the present invention as defined in the following claims. For example, while it is preferred that the air pillows be manufactured in a continuous web, i.e. be interconnected, the invention may also be practiced with non-interconnected air pillows. Accordingly, the invention is to be limited only by the scope of the following claims and their equivalents.

What is claimed is:

1. Apparatus for producing and conveying air pillows, said apparatus comprising:

an air pillow production machine which produces a continuous web of air filled pillows;

ductwork extending away from said air pillow production machine and through which the web of air pillows is conveyed;

a blower which conveys the web of air pillows from said air pillow production machine and through said ductwork;

a sensor which senses a condition of at least one of the air pillows in the web of air pillows being deflated; and a controller which controls said air pillow production machine in response to signals from said sensor.

2. The apparatus of claim 1 wherein said sensor is a mechanical probe which extends into a path of conveyance of the web of air pillows, said probe being movable to and between an engaged position and a disengaged position.

3. The apparatus of claim 2 wherein said probe is moved into the engaged position by the air pillows during conveyance of the web of air pillows, and moves to the disengaged position when said probe encounters a deflated air pillow in the web of air pillows.

4. The apparatus of claim 3 wherein said probe is a whisker trigger and said controller is a micro switch to which said whisker trigger is connected.

5. The apparatus of claim 4 wherein said micro switch interrupts power to said air pillow production machine when said whisker trigger moves to the disengaged position.

6. Apparatus for producing and conveying air pillows, said apparatus comprising:

an air pillow production machine which produces a continuous web of air filled pillows;

ductwork extending away from said air pillow production machine and through which the web of air pillows is conveyed;

a blower which conveys the web of air pillows from said air pillow production machine and through said ductwork;

a sensor which senses a stall condition of the web of air pillows in the event the web of air pillows stops moving through said ductwork; and a controller which controls said air pillow production machine in response to signals from said sensor;

wherein said sensor is a mechanical probe which extends into a path of conveyance of the web of air pillows, said probe being movable to and between an engaged position and a disengaged position.

7. The apparatus claim 6 wherein said probe is moved into the engaged position by the air pillows during conveyance of the web of air pillows, and moves to the disengaged position when the web of air pillows stops moving through said ductwork.

8. The apparatus of claim 7 wherein said probe is a whisker trigger and said controller is a micro switch to which said whisker trigger is connected.

9. The apparatus of claim 8 wherein said micro switch interrupts power to said air pillow production machine when said whisker trigger moves to the disengaged position.

10. The apparatus of any of claims 4, 5, 8, and 9, wherein the web of air pillows feeds downwardly from said air pillow production machine, around a guide member, and into a horizontal portion of said ductwork.

11. The apparatus of claim 10 wherein said micro switch is mounted to said guide member and said whisker trigger extends downwardly below said guide member such that the web of air pillows engages said whisker trigger as the web passes around said guide member and transitions from a vertical orientation to a horizontal orientation.

12. The apparatus of claim 11 wherein said guide member is circular in cross-section and is about 3 inches in diameter.

13. The apparatus of claim 12 wherein said circular guide member has a downwardly directed slot therein and wherein said whisker trigger passes through said slot.

14. The apparatus of claim 13 said slot defines a sector having an included angle of about 90 degrees.

15. The apparatus of claim 11 further including a blower box disposed between said blower and said ductwork, said guide member being mounted to said blower box.

16. Apparatus for producing, conveying and storing air pillows, said apparatus comprising:
    an air pillow production machine which produces a continuous web of air filled pillows;
    ductwork extending away from said air pillow production machine and through which the web of air pillows is conveyed;
    a blower which conveys the web of air pillows from said air pillow production machine and through said ductwork;
    a sensor which senses a condition of at least one of the air pillows in the web of air pillows being deflated;
    a controller which controls said air pillow production machine in response to signals from said sensor; and
    a hopper into which the web of air pillows is conveyed for storage.

17. The apparatus of claim 16 wherein said hopper has an open top and wherein the web of air pillows is conveyed into said hopper through said open top.

18. The apparatus of claim 17 wherein said hopper includes an opening near a bottom thereof through which air pillows may be pulled by an operator for insertion into a box.

19. Apparatus for conveying air pillows away from an air pillow production machine which produces a continuous web of air filled pillows, comprising:
    ductwork adapted to extend away from the air pillow production machine through which the web of pillows is conveyed; and
    a blower which conveys the web of air pillows through said ductwork;
    further comprising:
        a sensor which senses a condition of at least one of the air pillows in the web of air pillows being deflated; and
        a controller adapted to control the air pillow production machine in response to signals from said sensor.

20. Apparatus for conveying air pillows away from an air pillow production machine which produces a continuous web of air filled pillows and for storing the air pillows, comprising:
    ductwork adapted to extend away from the air pillow production machine through which the web of air pillows is conveyed;
    a blower which conveys the web of air pillows through said ductwork; and
    a hopper into which the web of air pillows is conveyed for storage;
    further comprising:
        a sensor which senses a condition of at least one of the air pillows in the web of air pillows being deflated; and
        a controller adapted to control the air pillow production machine in response to signals from said sensor.

* * * * *